United States Patent
Liu et al.

(10) Patent No.: US 9,866,862 B2
(45) Date of Patent: Jan. 9, 2018

(54) MOTION VECTOR REFERENCE SELECTION THROUGH REFERENCE FRAME BUFFER TRACKING

(71) Applicant: GOOGLE INC., Mountain View, CA (US)

(72) Inventors: Yuxin Liu, Palo Alto, CA (US); Debargha Mukherjee, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 153 days.

(21) Appl. No.: 15/074,329

(22) Filed: Mar. 18, 2016

(65) Prior Publication Data

US 2017/0272773 A1  Sep. 21, 2017

(51) Int. Cl.
| | |
|---|---|
| *H04N 19/52* | (2014.01) |
| *H04N 19/172* | (2014.01) |
| *H04N 19/176* | (2014.01) |
| *H04N 19/139* | (2014.01) |

(52) U.S. Cl.
CPC .......... *H04N 19/52* (2014.11); *H04N 19/139* (2014.11); *H04N 19/172* (2014.11); *H04N 19/176* (2014.11)

(58) Field of Classification Search
None
See application file for complete search history.

(56) References Cited

U.S. PATENT DOCUMENTS

| | | | |
|---|---|---|---|
| 8,824,560 B2 | 9/2014 | Bakke | |
| 8,995,536 B2 | 3/2015 | Subramanian et al. | |
| 9,014,266 B1 * | 4/2015 | Gu | H04N 19/159 375/240.13 |
| 2006/0120453 A1 * | 6/2006 | Ikeda | H04N 19/105 375/240.16 |

(Continued)

FOREIGN PATENT DOCUMENTS

| | | |
|---|---|---|
| CN | 104811721 A | 7/2015 |
| EP | 2605516 A1 | 6/2013 |

(Continued)

OTHER PUBLICATIONS

"VP9 Bitstream—superframe and uncompressed header", Draft, Rev 1.0, Dec. 12, 2015; http://downloads.webmproject.org/docs/vp9/vp9-bitstream_superframe-and-uncompressed-header_v1.0.pdf (Google Inc.); 29 pp.

(Continued)

*Primary Examiner* — Kate Luo
(74) *Attorney, Agent, or Firm* — Young Basile Hanlon & MacFarlane, P.C.

(57) ABSTRACT

Encoding or decoding a video signal includes determining multiple candidate motion vectors for a current block, the candidate motion vectors including a first motion vector used to predict a collocated block within a first frame. A reference frame identifier associated with the first motion vector can be compared to a reference buffer index of a reference frame used to predict the current block of a second frame. On the condition that the reference frame identifier is the same as the reference buffer index, the first motion vector is advanced ahead of remaining ones of the multiple candidate motion vectors.

20 Claims, 7 Drawing Sheets

(56) References Cited

U.S. PATENT DOCUMENTS

| | | | | |
|---|---|---|---|---|
| 2008/0170619 | A1* | 7/2008 | Landau | H04N 21/23412 375/240.16 |
| 2010/0309981 | A1* | 12/2010 | Nagori | H04N 19/61 375/240.16 |
| 2011/0090957 | A1 | 4/2011 | Liao et al. | |
| 2013/0170550 | A1* | 7/2013 | Li | H04N 19/52 375/240.16 |
| 2013/0279589 | A1* | 10/2013 | Gu | H04N 21/234 375/240.16 |
| 2015/0169452 | A1 | 6/2015 | Persson et al. | |
| 2015/0304682 | A1* | 10/2015 | Xu | H04N 19/61 375/240.16 |
| 2016/0021385 | A1* | 1/2016 | Chou | H04N 19/513 375/240.16 |
| 2016/0065973 | A1* | 3/2016 | Cote | H04N 19/172 375/240.16 |
| 2017/0289559 | A1* | 10/2017 | Bakke | H04N 19/433 |

FOREIGN PATENT DOCUMENTS

| | | |
|---|---|---|
| GB | 2488815 A | 9/2012 |
| WO | 2009115901 A2 | 9/2009 |

OTHER PUBLICATIONS

Bankoski et al., "Technical Overview of VP8, an Open Sourse Video Codec for the Wed". Dated Jul. 11, 2011.

Bankoski et al., "VP8 Data Format and Decoding Guide" Independent Submission. RFC 6389, Dated Nov. 2011.

Bankoski et al., "VP8 Data Format and Decoding Guide; draft-bankoski-vp8-bitstream-02" Network Working Group. Internet-Draft, May 18, 2011, 288 pp.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

Mozilla, "Introduction to Video Coding Part 1: Transform Coding", Video Compression Overview, Mar. 2012, 171 pp.

Overview; VP7 Data Format and Decoder. Version 1.5. On2 Technologies, Inc. Dated Mar. 28, 2005.

Series H: Audiovisual and Multimedia Systems; Infrastructure of audiovisual services—Coding of moving video. H.264. Advanced video coding for generic audiovisual services. International Telecommunication Union. Version 11. Dated Mar. 2009.

Series H: Audiovisual and Multimedia Systems; Infrastructure of audiovisual services—Coding of moving video. H.264. Advanced video coding for generic audiovisual services. International Telecommunication Union. Version 12. Dated Mar. 2010.

Series H: Audiovisual and Multimedia Systems; Infrastructure of audiovisual services—Coding of moving video. H.264. Amendment 2: New profiles for professional applications. International Telecommunication Union. Dated Apr. 2007.

Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.

Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.

Series H: Audiovisual and Multimedia Systems; Infrastructure of audiovisual services—Coding of moving video; Advanced video coding for generic audiovisual services. H.264. Version 1. International Telecommunication Union. Dated May 2003.

Series H: Audiovisual and Multimedia Systems; Infrastructure of audiovisual services—Coding of moving video; Advanced video coding for generic audiovisual services. H.264. Version 3. International Telecommunication Union. Dated Mar. 2005.

VP6 Bitstream & Ecoder Specification. Version 1.02. On2 Technologies, Inc. Dated Aug. 17, 2006.

VP6 Bitstream & Ecoder Specification. Version 1.03. On2 Technologies, Inc. Dated Oct. 29, 2007.

VP8 Data Format and Decoding Guide. WebM Project. Google On2. Dated: Dec. 1, 2010.

Combined Search and Examination Report in corresponding foreign Application No. GB1621543.6, dated May 18, 2017.

\* cited by examiner

MOTION VECTOR REFERENCE SELECTION THROUGH REFERENCE FRAME BUFFER TRACKING

BACKGROUND

Digital video streams typically represent video using a sequence of frames or still images. Each frame can include a number of blocks, which in turn can contain information describing the value of color, brightness or other attributes for pixels. The amount of data in a typical video stream is large, and transmission and storage of video can use significant computing or communications resources. Due to the large amount of data involved in video data, high performance compression is needed for transmission and storage. In block-based codecs, this involves prediction techniques, including prediction using motion vectors.

SUMMARY

This disclosure relates in general to encoding and decoding visual data, such as video stream data, using a computing device, the video stream having a sequence of frames, each frame having blocks, and each block having pixels. This disclosure includes storing a reference frame identifier with a reference buffer index for each of a plurality of reference frames after encoding a first frame of the sequence of frames, updating the plurality of reference frames by updating a reference frame associated with a reference frame identifier after the storing determining multiple candidate motion vectors for a current block, of a second frame after the updating, the multiple candidate motion vectors including a first motion vector used to predict a collocated block within the first frame, performing a motion search for the current block within a reference frame of the plurality of reference frames, after the updating, to generate a second motion vector and comparing the reference buffer index stored with the reference frame identifier of the reference frame associated with the first motion vector to a reference buffer index of the reference frame used in the performing, on a condition that the reference buffer index of the reference frame used in the performing matches the reference buffer index stored with the reference frame identifier of the reference frame associated with the first motion vector, advancing the first motion vector ahead of remaining ones of the multiple candidate motion vectors for encoding the current block.

One aspect of the disclosure herein includes encoding and decoding visual data, wherein the second frame is subsequent to the first frame in the sequence, one of the plurality of reference frames comprises a last frame in the sequence before a current frame being encoded and has a last frame identifier as the reference frame identifier and updating the plurality of reference frames comprises updating a reference buffer index associated with the last frame identifier to a reference buffer index of the first reference frame. The plurality of reference frames comprises a golden frame and an alternate reference frame and updating the plurality of reference frames comprises updating only the reference buffer index associated with the last frame identifier. The plurality of reference frames comprises a golden frame having a golden frame identifier as the reference frame identifier and an alternate reference frame having an alternate reference frame identifier as the reference frame identifier; and at least one of: updating the plurality of reference frames comprises updating a reference buffer index associated with the alternate reference frame identifier to a reference buffer index of a new alternate reference frame; or updating the plurality of reference frames comprises updating a reference buffer index associated with the golden frame identifier to a reference buffer index of a new golden frame.

One aspect of the disclosure herein includes encoding and decoding visual data, wherein updating the plurality of reference frames comprises updating at least two reference frames associated with respective reference frame identifiers after the storing, the multiple candidate motion vectors including a third motion vector used to predict the collocated block within the first frame, performing a second motion search for the second block within a different reference frame of the plurality of reference frames, after the updating, to generate a fourth motion vector, comparing the reference buffer index stored with the reference frame identifier of the reference frame associated with the third motion vector to a reference buffer index of the reference frame used in performing the second motion search, advancing the first motion vector ahead of remaining ones of the multiple candidate motion vectors for encoding the current block comprises advancing the first motion vector ahead of remaining ones of the multiple candidate motion vectors for encoding the third motion vector, and on a condition that the reference buffer index of the reference frame used in performing the second motion search matches the reference buffer index stored with the reference frame identifier of the reference frame associated with the third motion vector, advancing the second motion vector ahead of remaining ones of the multiple candidate motion vectors for encoding the fourth motion vector.

One aspect of an apparatus described herein includes a processor and a non-transitory memory that stores instructions causing the processor to perform a method including storing a reference frame identifier with a reference buffer index for each of a plurality of reference frames after encoding a first frame of the sequence of frames, updating the plurality of reference frames by updating a reference frame associated with a reference frame identifier after the storing, determining multiple candidate motion vectors for a current block of a second frame after the updating, the multiple candidate motion vectors including a first motion vector used to predict a collocated block within the first frame, performing a motion search for the current block within a reference frame of the plurality of reference frames, after the updating, to generate a second motion vector and comparing the reference buffer index stored with the reference frame identifier of the reference frame associated with the first motion vector to a reference buffer index of the reference frame used in the performing, on a condition that the reference buffer index of the reference frame used in the performing matches the reference buffer index stored with the reference frame identifier of the reference frame associated with the first motion vector, advancing the first motion vector ahead of remaining ones of the multiple candidate motion vectors for encoding the current block.

These and other aspects of this disclosure are described in additional detail in the following detailed description, the appended claims and the accompanying figures.

BRIEF DESCRIPTION OF THE DRAWINGS

The description herein makes reference to the accompanying drawings described below wherein like reference numerals refer to like parts throughout the several views.

DETAILED DESCRIPTION

Figure 1:
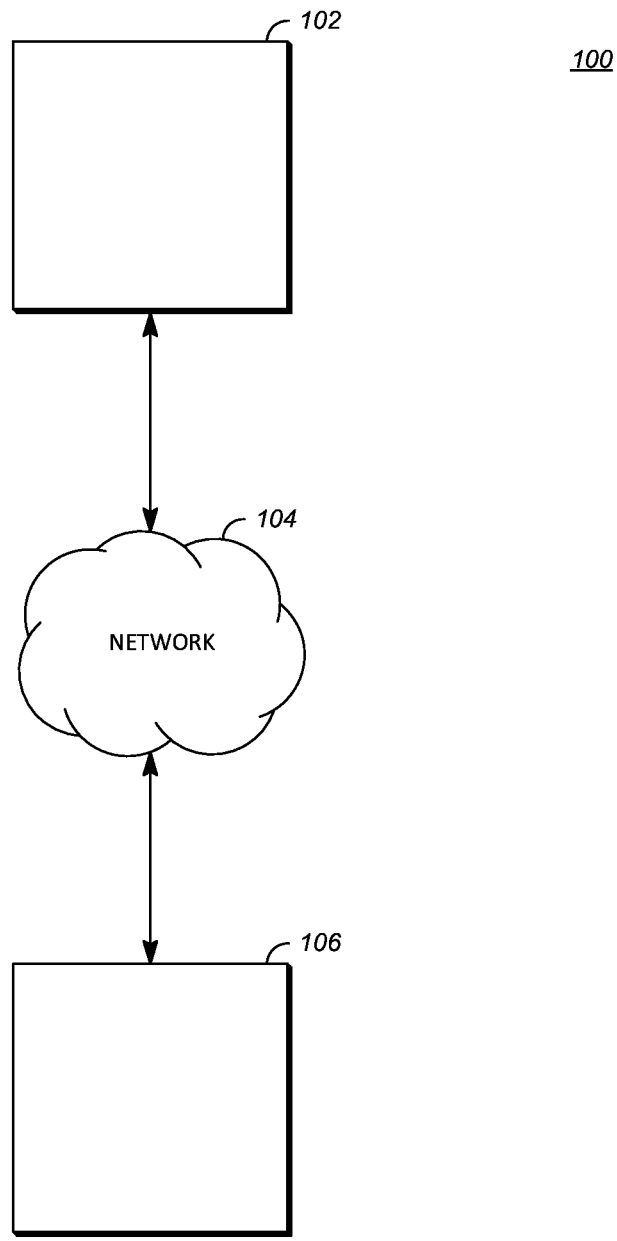
FIG. 1 is a schematic of a video encoding and decoding system.

A video stream can be compressed by a variety of techniques to reduce bandwidth required transmit or store the video stream. A video stream can be encoded into a bitstream, which can involve compression, and then transmitted to a decoder that can decode or decompress the video stream to prepare it for viewing or further processing. Compression of the video stream often exploits spatial and temporal correlation of video signals through spatial and/or motion compensated prediction. Inter-prediction, for example, uses one or more motion vectors to generate a block (also called a prediction block) that resembles a current block to be encoded using previously encoded and decoded pixels. By encoding the motion vector(s), and the difference between the two blocks, a decoder receiving the encoded signal can re-create the current block.

Each motion vector used to generate a prediction block refers to a frame other than the current frame, i.e., a reference frame. Reference frames can be located before or after the current frame in the sequence of the video stream. For example, one common reference frame for encoding a current frame is the last frame, which is the frame immediately before the current frame in the sequence. Where more than one motion vector is used to generate the prediction block, each motion vector can refer to a separate reference frame. A block that is predicted using a single prediction block (e.g., generated using a single motion vector) is referred to herein as a single reference case, while a block that is predicted using more than one reference block (e.g., generated using two or more motion vectors) is referred to herein as a compound reference case.

A motion vector reference can be useful in the process of inter-prediction. Generally, a motion vector reference is a motion vector that is already determined from encoding a different block before the current block. A motion vector reference can be used to differentially encode (and hence decode) a motion vector used to encode the current block. Encoding the motion vector differentially in this fashion can permit the encoded motion vector to be included in the video stream as a small fixed number of bits, for example. Alternatively or additionally, a motion vector reference can be used as one of a number of candidate motion vectors for determining the motion vector used to encode the current block. A motion vector reference can be obtained from blocks spatially adjacent to the current block. A motion vector reference can also be a temporal motion vector reference that is determined from a temporally neighboring block, also called a co-located block, as it is located at the same pixel positions with respect to its frame as the current block to be encoded.

As mentioned, each motion vector can refer to one of several available reference frames. Thus, each motion vector reference can refer to one of several available reference frames. A signal can be sent indicating that the reference frame that includes the motion vector reference is one of the available reference frames. Instead of signaling a frame identifier itself, which can be a relatively long sequence of bits, the signal can be a shorter sequence of bits that identifies the type of reference frame. In some video codecs, for example, there are three types of reference frames—the last frame (LAST_FRAME), a golden frame (GOLDEN_FRAME), and an alternative reference frame (ALTREF_FRAME).

Disclosed aspects can check whether a reference frame of a motion vector used to predict a co-located block in a previously coded frame is the same type as a reference frame that is being used for the current block. If they are the same type, the motion vector is considered at a higher priority for coding the current motion vector than any other motion vectors that do not meet this test. For example if current block has chosen LAST_FRAME, and its collocated block in the previous frame also chooses LAST_FRAME, then the motion vector of the collocated block can be considered at a higher priority as the motion vector reference for the coding of the current motion vector.

A problem can exist in the above approach in the fact that after coding each frame the reference buffer will be updated, and consequently, one or more frames in the reference buffer can be replaced by a newly coded frame. Hence, even if both blocks in the previous frame and in the current frame respectively choose the same reference frame, e.g. LAST_FRAME, they cannot point to the actual identical reference frame buffer. Aspects of disclosed implementations address this problem by identifying whether the collocated block in the previous frame uses identical reference frames as the current block. Only when the answer is true can the motion vector or vectors of the collocated block will be treated at a higher priority than other motion vector references for coding the current motion vector.

Further details are described after an initial discussion of the environment in which the teachings herein can be used.

FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102 and the encoded video stream can be decoded in the receiving station 106. The network 104 can be, for example, the Internet. The network 104 can also be a local area network (LAN), wide area network (WAN), virtual private network (VPN), cellular telephone network or any other means of transferring the video stream from the transmitting station 102 to, in this example, the receiving station 106.

Figure 2:
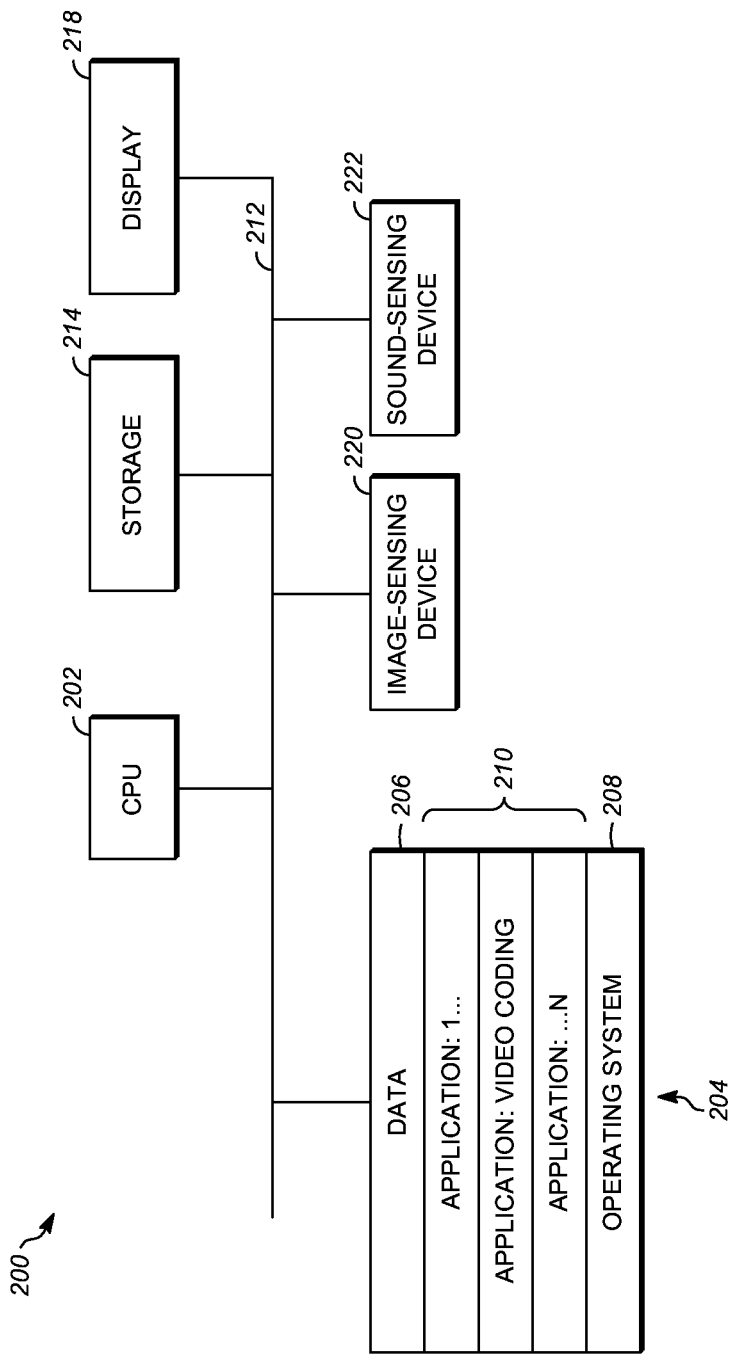
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP can be used, e.g., a Hypertext-Transfer Protocol (HTTP)-based video streaming protocol.

When used in a video conferencing system, for example, the transmitting station 102 and/or the receiving station 106 can include the ability to both encode and decode a video stream as described below. For example, the receiving station 106 could be a video conference participant who receives an encoded video bitstream from a video conference server (e.g., the transmitting station 102) to decode and view and further encodes and transmits its own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of a single computing device, for example, a mobile phone, a tablet computer, a laptop computer, a notebook computer, a desktop computer, and the like.

A CPU 202 in the computing device 200 can be a conventional central processing unit. Alternatively, the CPU 202 can be any other type of device, or multiple devices, capable of manipulating or processing information now-existing or hereafter developed. Although the disclosed implementations can be practiced with a single processor as shown, e.g., the CPU 202, advantages in speed and efficiency can be achieved using more than one processor.

A memory 204 in the computing device 200 can be a read only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described here. For example, the application programs 210 can include applications 1 through N, which further include a video coding application that performs the methods described here. The computing device 200 can also include a secondary storage 214, which can, for example, be a memory card used with a mobile computing device. Because the video communication sessions can contain a significant amount of information, they can be stored in whole or in part in the secondary storage 214 and loaded into the memory 204 as needed for processing.

The computing device 200 can also include one or more output devices, such as a display 218. The display 218 can be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display or light emitting diode (LED) display, such as an organic LED (OLED) display.

The computing device 200 can also include or be in communication with an image-sensing device 220, for example a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into a single unit, other configurations can be utilized. The operations of the CPU 202 can be distributed across multiple machines (each machine having one or more of processors) that can be coupled directly or across a local area or other network. The memory 204 can be distributed across multiple machines such as a network-based memory or memory in multiple machines performing the operations of the computing device 200. Although depicted here as a single bus, the bus 212 of the computing device 200 can be composed of multiple buses. Further, the secondary storage 214 can be directly coupled to the other components of the computing device 200 or can be accessed via a network and can comprise a single integrated unit such as a memory card or multiple units such as multiple memory cards. The computing device 200 can thus be implemented in a wide variety of configurations.

Figure 3:
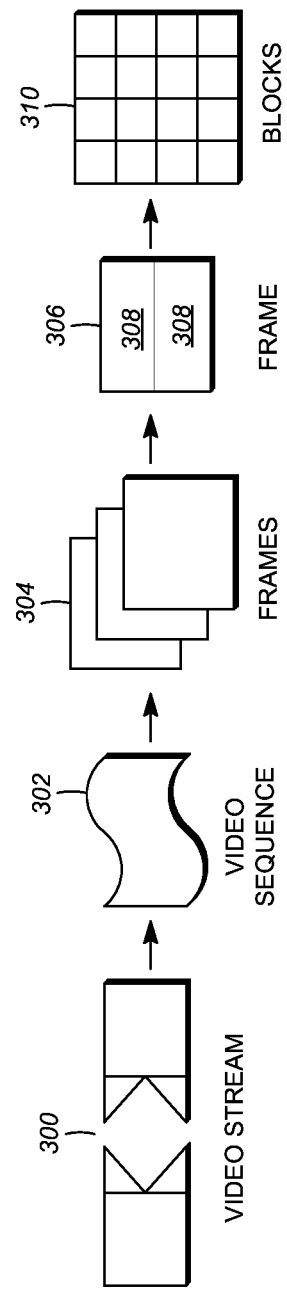
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, e.g., a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, the frame 306 of color video data can include a luminance plane and two chrominance planes. The segments 308 can be sampled at different resolutions.

Whether or not the frame 306 is divided into the segments 308, the frame 306 can be further subdivided into blocks 310, which can contain data corresponding to, for example, 16×16 pixels in the frame 306. The blocks 310 can also be arranged to include data from one or more planes of pixel data. The blocks 310 can also be of any other suitable size such as 4×4 pixels, 8×8 pixels, 16×8 pixels, 8×16 pixels, 16×16 pixels, or larger. The blocks 310 or other regions resulting from partitioning of the frames 306 can be partitioned according to the teachings herein as discussed in more detail below. That is, the regions to be encoded can be larger regions partitioned into smaller sub-blocks or regions. More particularly, a current region to be encoded can be split into smaller groups of pixels that are encoded using, e.g., different prediction modes. These groups of pixels can be referred to herein as prediction sub-blocks, prediction sub-regions, or prediction units. In some cases, there is only one prediction sub-region that encompasses the entire region to be encoded as the region is encoded using only one prediction mode. Unless otherwise stated, the description of encoding and decoding a block in FIGS. 4 and 5 below applies equally to prediction sub-blocks, prediction sub-regions, or prediction units of a larger region.

Figure 4:
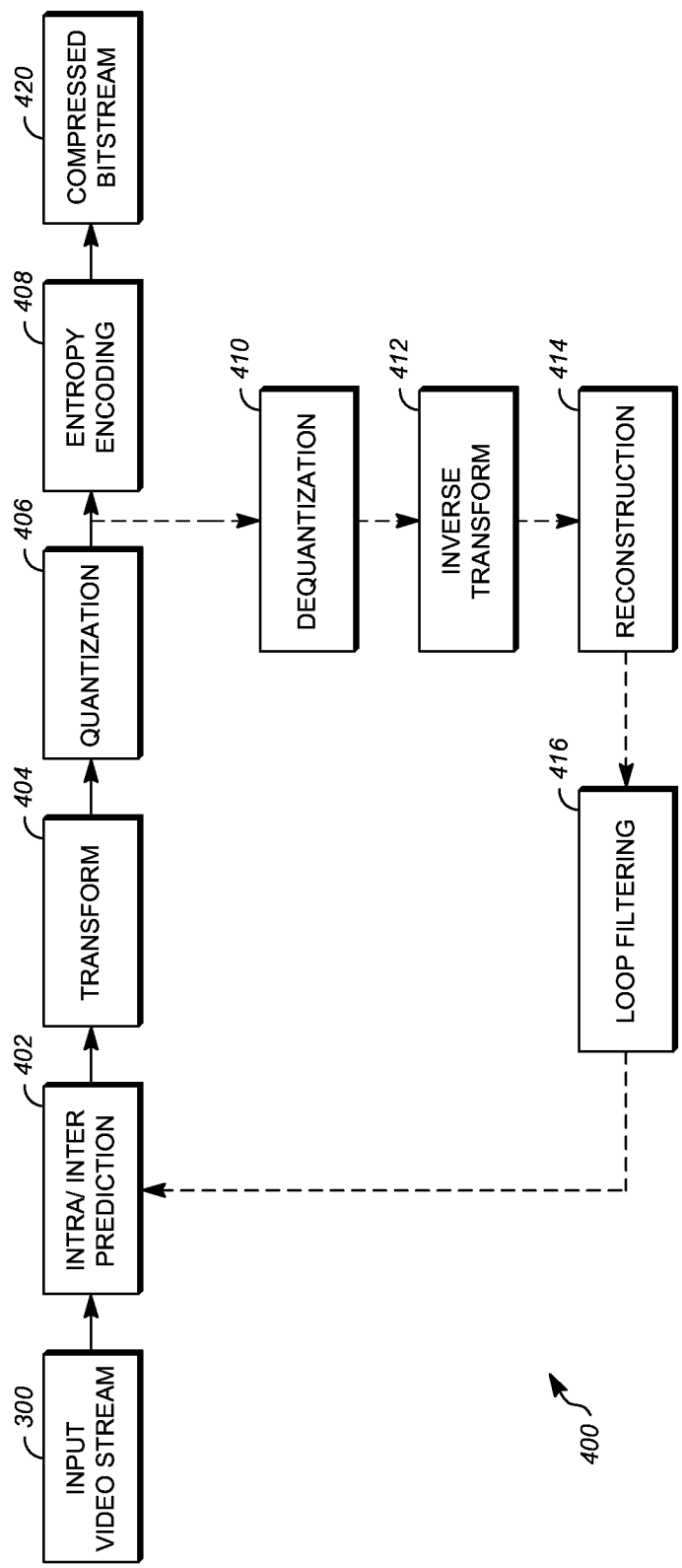
FIG. 4 is a block diagram of a video compression system according to an aspect of the teachings herein.

FIG. 4 is a block diagram of an encoder 400 in accordance with an implementation. The encoder 400 can be implemented, as described above, in the transmitting station 102 such as by providing a computer software program stored in memory, for example, the memory 204. The computer software program can include machine instructions that, when executed by a processor such as the CPU 202, cause the transmitting station 102 to encode video data in the manner described in FIG. 4. The encoder 400 can also be implemented as specialized hardware included in, for example, the transmitting station 102. The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 can also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, the frame 306 can be processed in units of pixels (e.g., regions) such as blocks by example. At the intra/inter prediction stage 402, a block can be encoded using intra-frame prediction (also called intra prediction) or inter-frame prediction (also called inter prediction or inter-prediction herein). In any case, a prediction (or predictor) block can be formed. In the case of intra-prediction, a prediction block can be formed from samples in the current frame that have been previously encoded and reconstructed. In the case of inter-prediction, a prediction block can be formed from samples in one or more previously constructed reference frames.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. Such block-based transforms include, for example, the Discrete Cosine Transform (DCT) and the Asymmetric Discrete Sine Transform (ADST). Other block-based transforms are possible. Further, combinations of different transforms can be applied to a single residual. In one example of application of a transform, the DCT transforms the residual block into the frequency domain where the transform coefficient values are based on spatial frequency. The lowest frequency (DC) coefficient at the top-left of the matrix and the highest frequency coefficient at the bottom-right of the matrix. It is worth noting that the size of a prediction block, and hence the resulting residual block, can be different from the size of the transform block. For example, the residual block or region can be split into smaller blocks regions to which separate transforms are applied.

The quantization stage 406 converts the transform coefficients into discrete quantum values, which are referred to as quantized transform coefficients, using a quantizer value or a quantization level. For example, the transform coefficients can be divided by the quantizer value and truncated. The quantized transform coefficients are then entropy encoded by the entropy encoding stage 408. Entropy coding can be performed using any number of techniques, including token and binary trees. The entropy-encoded coefficients, together with other information used to decode the block, which can include for example the type of prediction used, transform type, motion vectors and quantizer value, are then output to the compressed bitstream 420. The compressed bitstream 420 can also be referred to as an encoded video stream or encoded video bitstream, and the terms will be used interchangeably herein.

The reconstruction path in FIG. 4 (shown by the dotted connection lines) can be used to ensure that both the encoder 400 and a decoder 500 (described below) use the same reference frames to decode the compressed bitstream 420. The reconstruction path performs functions that are similar to functions that take place during the decoding process that are discussed in more detail below, including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder 400 can quantize the residual signal directly without the transform stage 404 for certain blocks or frames. In another implementation, an encoder 400 can have the quantization stage 406 and the dequantization stage 410 combined into a single stage. The encoder 400 can encode any size or shape groups of pixels according to this technique. The groups of pixels to be encoded can thus be more generally referred to as regions.

Figure 5:
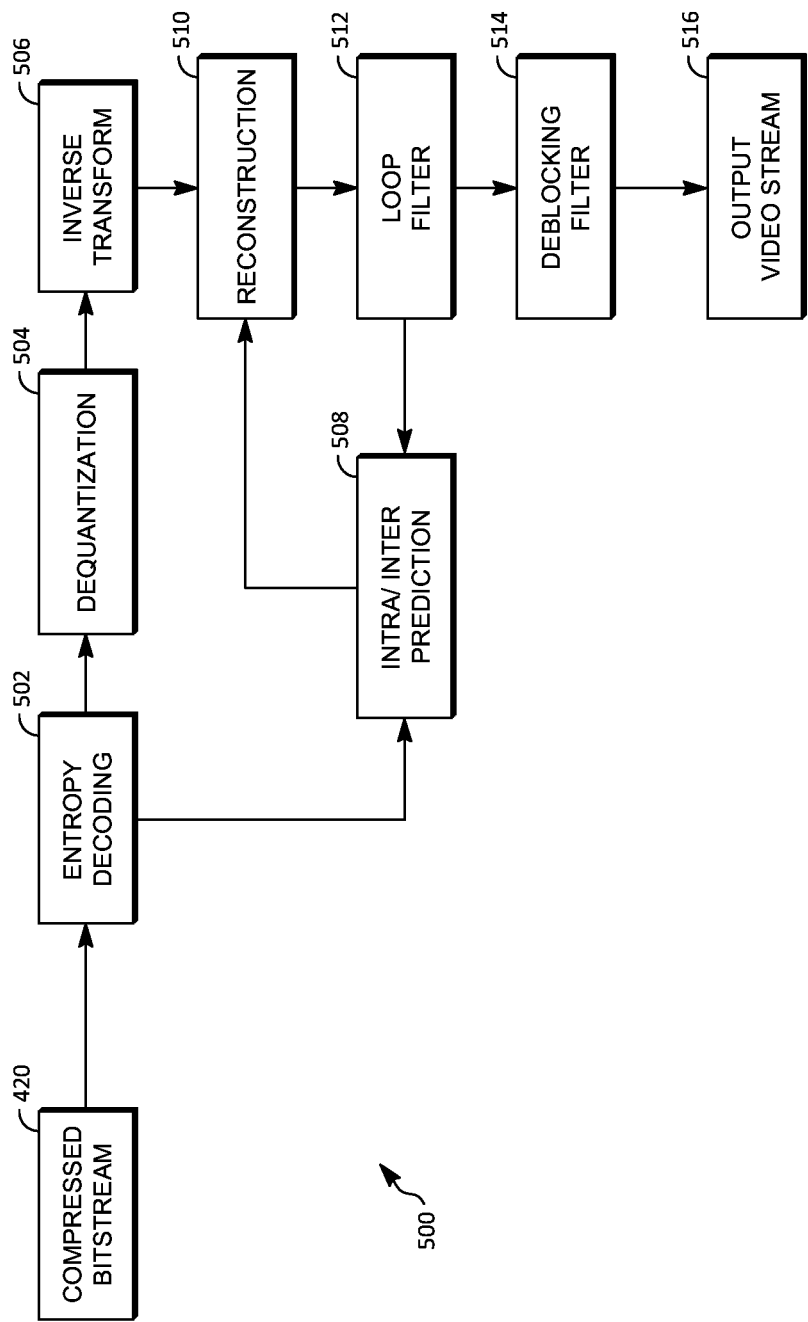
FIG. 5 is a block diagram of a video decompression system according to another aspect of the teachings herein.

FIG. 5 is a block diagram of a decoder 500 in accordance with another implementation. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512 and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients using the selected transform type to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400, e.g., at the intra/inter prediction stage 402. At the reconstruction stage 510, the prediction block can be added to the derivative residual to create a reconstructed block. The loop filtering stage 512 can be applied to the reconstructed block to reduce blocking artifacts. Other filtering can be applied to the reconstructed block. In this example, the deblocking filtering stage 514 is applied to the reconstructed block to reduce blocking distortion, and the result is output as an output video stream 516. The output video stream 516 can also be referred to as a decoded video stream, and the terms will be used interchangeably herein.

Other variations of the decoder 500 can be used to decode the compressed bitstream 420. For example, the decoder 500 can produce the output video stream 516 without the deblocking filtering stage 514. While described with reference to blocks for simplicity of explanation, the decoder 500 can decode any size or shape groups of pixels (e.g., regions) according to this technique.

As mentioned briefly above, a frame or region of a frame can be partitioned for encoding or decoding by last frame motion vector partitioning—that is, by adjusting the last frame's partitioning using a motion vector. In general, a region is split into separate regions by shifting the prior frame partitions by one of the motion vectors covered by the new region's motion vector.

Figure 6:
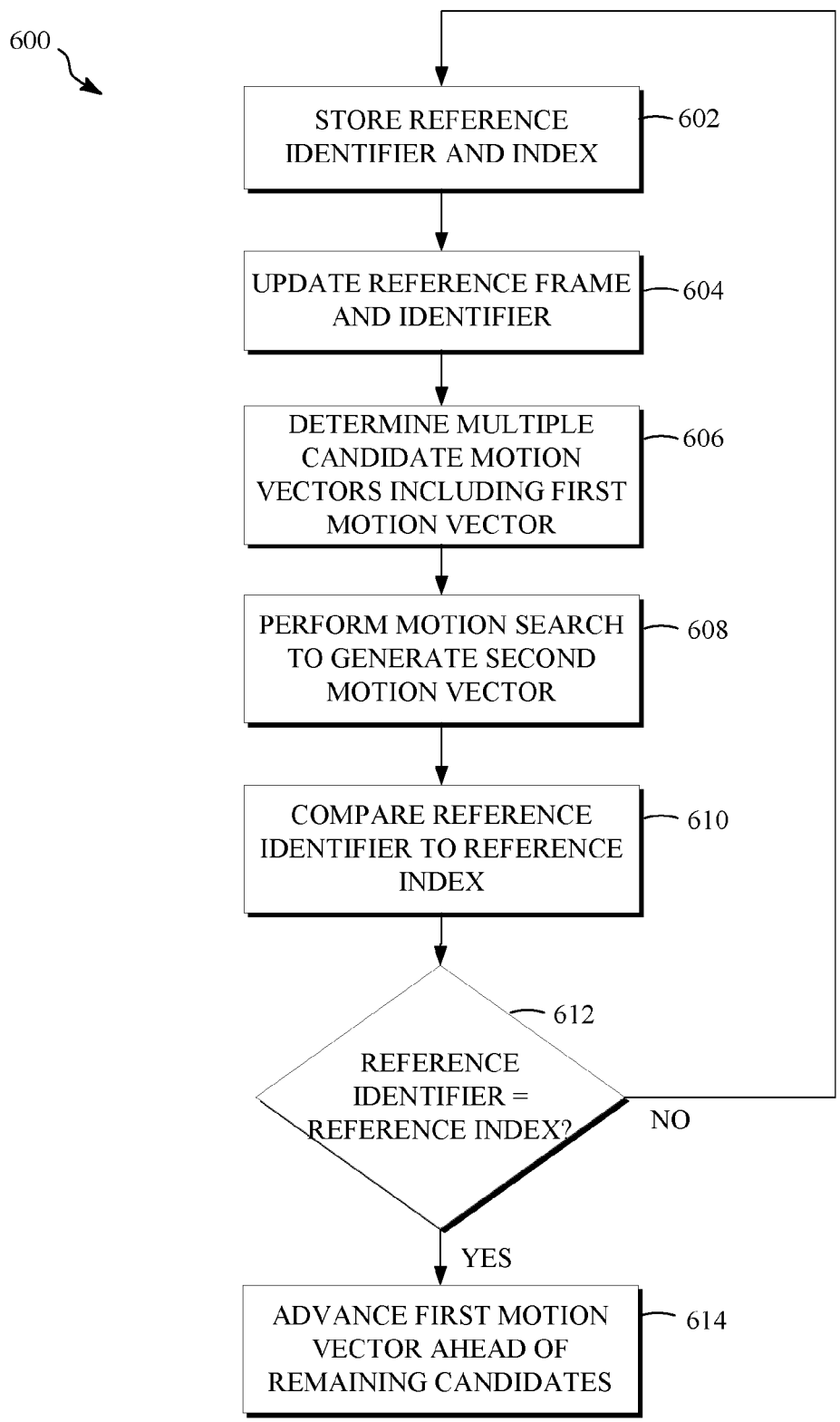
FIG. 6 is a flowchart diagram of a process for selecting a motion vector reference through reference frame buffer tracking.

FIG. 6 is a flowchart diagram of a process 600 for encoding or decoding a video stream according to one implementation of this disclosure. The method or process 600 can be implemented in a system such as the computing device 200 to aid the encoding or decoding of a video stream. The process 600 can be implemented, for example, as a software program that is executed by a computing device such as the transmitting station 102 or the receiving station 106. The software program can include machine-readable instructions that are stored in a memory such as the memory 204 that, when executed by a processor such as the CPU 202, cause the computing device to perform the process 600. The process 600 can also be implemented using hardware in whole or in part. As explained above, some computing devices can have multiple memories and multiple processors, and the steps or operations of the process 600 can in such cases be distributed using different processors and memories. Use of the terms "processor" and "memory" in the singular herein encompasses computing devices that have only one processor or one memory as well as devices having multiple processors or memories that can each be used in the performance of some but not necessarily all recited steps.

For simplicity of explanation, the process 600 is depicted and described as a series of steps or operations. However, steps and operations in accordance with this disclosure can occur in various orders and/or concurrently. Additionally, steps or operations in accordance with this disclosure can occur with other steps or operations not presented and described herein. Furthermore, not all illustrated steps or operations can be required to implement a method in accordance with the disclosed subject matter. The process 600 can be repeated for each block of each frame of the input signal. In some implementations, only some blocks of one or more frames are processed according to the process 600. For example, blocks encoded using intra-prediction modes can be omitted when performing the process 600.

When the process 600 is an encoding process, the input signal can be, for example, the video stream 300. The input signal can be received by the computer performing the process 600 in any number of ways. For example, the input signal can be captured by the image-sensing device 220 or received from another device through an input connected to the bus 212. The input signal could be retrieved from the secondary storage 214 in another implementation. Other ways of receiving and other sources of the input signal are possible. For example, when the process 600 is a decoding process, the input signal can be an encoded bitstream such as the compressed bitstream 420.

Figure 7:
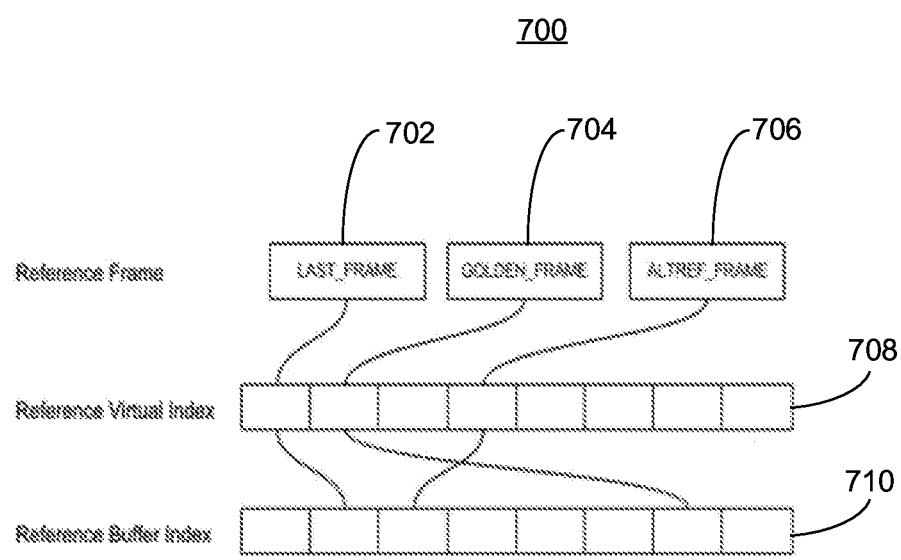
FIG. 7 is a diagram of one example of reference buffer updating used to explain the process of FIG. 6.

Using the video stream, at step 602 process 600 stores a reference frame identifier with a reference buffer index for each of a plurality of reference frames after encoding a first frame of the sequence of frames of the video stream. Step 602 can be explained with reference to FIG. 7. FIG. 7 shows Reference Frames 700, including LAST_FRAME 702, GOLDEN_FRAME 704 and ALTREF_FRAME 706. One of these three Reference Frames 700 will be signaled as the Reference Frame 700 for each block in the block header. At the frame header level, the one-on-one mapping from Reference Frame 700 to the Reference Virtual Identifier or Index 708 will be written to the bitstream. Another one-on-one mapping will be maintained for each frame to mapfrom the Reference Virtual Index 708 to the Reference Buffer Identifier or Index 710. For two consecutive Inter frames, when two Reference Frames 700 are mapped to the same Reference Buffer Index 710, process 600 indicates that they are the same references. The example of FIG. 7 has eight available Reference Virtual Indices 708 and eight Reference Buffer Indices 710.

To track whether the previous collocated block uses the identical reference as that of the current block, both the encoder and decoder can track Reference Frame 700 buffer updates and save the Reference Buffer Index 710 mappings for the previously coded frame. Thus, the encoder and decoder can identify whether the two reference frames used by the collocated block and that by the current block are mapped to an identical Reference Buffer Index 710. For example, by the end of the coding of each frame, before the updating of the reference frame buffer, the Reference Buffer Index 710 table corresponding to each Reference Frame 700 can be stored, both at the encoder and at the decoder.

When checking the motion vector of the collocated block, process 600 can first identify the Reference Frame 700 used for the collocated block. Instead of using this Reference Frame 700 value in a direct comparison with the current block, the decoder or encoder can identify its Reference Buffer Index 710. The Reference Buffer Index 710 for the Reference Frame 700 of the current block is compared to the Reference Buffer Indices 710 for the collocated block. If they are identical, the motion vector of the collocated block will be taken as a motion vector reference for the current motion vector at a higher priority.

Returning to FIG. 6, process 600 updates the Reference Frame 700 and the Reference Virtual Index 708 associated with the Reference Frame 700 at step 604. At step 606, process 600 determines multiple candidate motion vectors for a current block of a second frame, the multiple candidate motion vectors including a first motion vector used to predict a collocated block within the first frame. At step 608, process 600 performs a motion search for the current block within a Reference Frame 700 of the plurality of Reference Frames 700, after the updating, to generate a second motion vector. At step 610, process 600 compares the Reference Buffer Index 710 stored with the Reference Virtual Index 708 of the Reference Frame 700 associated with the first motion vector to a Reference Buffer Index 710 of the Reference Frame 700 used in performing the motion search.

At step 612, process 600 determines if the Reference Virtual Index 708 of the Reference Frame 700 used in performing the motion search matches the Reference Buffer Index 710 associated with the first motion vector. If a match is found, process 600 advances to step 614, where the first motion vector can be advanced ahead of remaining ones of the plurality of candidate motion vectors for encoding the current block; otherwise process 600 returns to step 602 to process another block.

Advancing the first motion vector ahead of the remaining candidate motion vectors for encoding the current block can cause the selected motion vector to more accurately predict the current motion vector. Therefore the difference between the predicted motion vector and the current motion vector will be small and can be represented in the video stream in a small number of bits, thereby saving bandwidth.

Aspects of disclosed implementations can predict motion vectors in cases where a current block of a current frame is predicted using bi-prediction, where two reference frames can be used to predict a current block. In bi-prediction, both the current frame and the previous frame used for motion vector prediction can be forward predicted using either LAST_FRAME 702 or GOLDEN_FRAME 704 or backward predicted using ALTREF_FRAME 706. As disclosed above in relation to FIG. 6, disclosed aspects can determine if a previous frame used for motion prediction can have the same reference frame as a current frame. In cases where a current frame and a previous frame are predicted using bi-prediction, motion vector candidates from the co-located block in the previous frame can be determined through tracking updates of the reference frame buffer using the following steps:

(1) Check whether a smooth motion exists across three consecutive frames, through tracking the reference frame buffer updates for both the previous frame and the frame before the previous one, using the following checking rules: For the pair of the current block and its co-located block, both use its previously coded frame as its reference and both reference frames have the same sign bias for forward prediction;

(2) If there is a second frame for the current block, for example when a compound mode is available for the current block, then repeat step (1) for the second frame to check whether there is a smooth motion that exists for the second frame.

(3) Check if the sign bias indicates backward prediction for both the current block and its co-located block and if identical frames have been used as reference for both blocks, using the following rule: First check if the current blocks uses ALTREF_FRAME 706 as its reference frame, which indicates that backward motion is considered; If so, then check whether the co-located block also uses backward prediction, by identifying the sign bias of its reference frame; If so, then check whether the current block and its co-located block use an identical frame as their references. If so, advance the motion vector associated with the previous frame ahead of the remaining candidate motion vectors.

(4) If there is a second frame for the current block, for example when compound mode is considered for the current block, then repeat step (3) for the second frame to check whether there is backward prediction for both the current block and the co-located blocks and both blocks use an identical frame for backward prediction. If so, advance the motion vector associated with the previous frame ahead of the remaining candidate motion vectors.

(5) Check whether the current block and the co-located block use an identical frame as their reference frames. If so, advance the motion vector associated with the previous frame ahead of the remaining candidate motion vectors.

(6) If there is a second frame for the current block, for example when a compound mode is considered for the current block, then repeat step (5) for the second frame to check whether there is an identical frame that has been used for both the current block and the co-located block as their references. If so, advance the motion vector associated with the previous frame ahead of the remaining candidate motion vectors.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms and/or instructions described herein. In addition or alternatively, for example, a special purpose computer/processor can be utilized that contains other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server and the receiving station 106 can be implemented on a device separate from the server, such as a hand-held communications device. In this instance, the transmitting station 102 can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device and/or a device including an encoder 400 can also include a decoder 500.

Further, all or a portion of implementations of the present disclosure can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for encoding a video stream using a computing device, the video stream having a sequence of frames, the frame having blocks formed of pixels, the method comprising:
    storing a reference frame identifier with a reference buffer index for each of a plurality of reference frames after encoding a first frame of the sequence of frames;
    updating the plurality of reference frames by updating a reference frame associated with a reference frame identifier after the storing;
    determining multiple candidate motion vectors for a current block of a second frame after the updating, the multiple candidate motion vectors including a first motion vector used to predict a collocated block within the first frame;
    performing a motion search for the current block within a reference frame of the plurality of reference frames, after the updating, to generate a second motion vector;
    comparing the reference buffer index stored with the reference frame identifier of the reference frame associated with the first motion vector to a reference buffer index of the reference frame used in the performing; and
    on a condition that the reference buffer index of the reference frame used in the performing matches the reference buffer index stored with the reference frame identifier of the reference frame associated with the first motion vector, advancing the first motion vector ahead of remaining ones of the multiple candidate motion vectors for encoding the current block.

2. The method of claim 1, wherein:
    the second frame is subsequent to the first frame in the sequence;
    one of the plurality of reference frames comprises a last frame in the sequence before a current frame being encoded and has a last frame identifier as the reference frame identifier; and
    updating the plurality of reference frames comprises updating a reference buffer index associated with the last frame identifier to a reference buffer index of the first frame.

3. The method of claim 2, wherein:
    the plurality of reference frames comprises a golden frame and an alternate reference frame; and
    updating the plurality of reference frames comprises updating only the reference buffer index associated with the last frame identifier.

4. The method of claim 2, wherein:
    the plurality of reference frames comprises a golden frame having a golden frame identifier as the reference frame identifier and an alternate reference frame having an alternate reference frame identifier as the reference frame identifier; and at least one of:
    updating the plurality of reference frames comprises updating a reference buffer index associated with the alternate reference frame identifier to a reference buffer index of a new alternate reference frame; or
    updating the plurality of reference frames comprises updating a reference buffer index associated with the golden frame identifier to a reference buffer index of a new golden frame.

5. The method of claim 1, further comprising:
    encoding the second motion vector using the first motion vector as a motion vector predictor.

6. The method of claim 1, wherein:
    advancing the first motion vector ahead of remaining ones of the multiple candidate motion vectors for encoding the current block comprises performing the motion search by initializing the motion search using the first motion vector.

7. The method of claim 6, further comprising:
    encoding the second motion vector using the first motion vector as a motion vector predictor.

8. The method of claim 1, further comprising:
    updating the plurality of reference frames comprises updating at least two reference frames associated with respective reference frame identifiers after the storing;

the multiple candidate motion vectors including a third motion vector used to predict the collocated block within the first frame;
performing a second motion search for a second block within a different reference frame of the plurality of reference frames, after the updating, to generate a fourth motion vector;
comparing the reference buffer index stored with the reference frame identifier of the reference frame associated with the third motion vector to a reference buffer index of the reference frame used in performing the second motion search;
advancing the first motion vector ahead of remaining ones of the multiple candidate motion vectors for encoding the current block comprises advancing the first motion vector ahead of remaining ones of the multiple candidate motion vectors for encoding the third motion vector; and
on a condition that the reference buffer index of the reference frame used in performing the second motion search matches the reference buffer index stored with the reference frame identifier of the reference frame associated with the third motion vector, advancing the second motion vector ahead of remaining ones of the multiple candidate motion vectors for encoding the fourth motion vector.

9. An apparatus for encoding a video stream, the video stream having a sequence of frames, the frames having blocks formed of pixels, the apparatus comprising:
a processor; and
a memory storing instructions that cause the processor to perform a method comprising:
storing a reference frame identifier with a reference buffer index for each of a plurality of reference frames after encoding a first frame of the sequence of frames;
updating the plurality of reference frames by updating a reference frame associated with a reference frame identifier after the storing;
determining multiple candidate motion vectors for a current block of a second frame after the updating, the multiple candidate motion vectors including a first motion vector used to predict a collocated block within the first frame;
performing a motion search for the current block within a reference frame of the plurality of reference frames, after the updating, to generate a second motion vector; and
comparing the reference buffer index stored with the reference frame identifier of the reference frame associated with the first motion vector to a reference buffer index of the reference frame used in the performing; and
on a condition that the reference buffer index of the reference frame used in the performing matches the reference buffer index stored with the reference frame identifier of the reference frame associated with the first motion vector, advancing the first motion vector ahead of remaining ones of the multiple candidate motion vectors for encoding the current block.

10. The apparatus of claim 9, further comprising:
a second memory separate from the memory; and
the reference buffer index for each of the plurality of references frames represents a unique location for a reference frame within the second memory.

11. The apparatus of claim 9, the instructions further comprising instructions for:
encoding the first frame into an encoded video bitstream by encoding the collocated block using the first motion vector and the reference frame associated with the first motion vector;
associating the reference frame associated with the first motion vector with a reference virtual index, and associating the reference virtual index with the reference buffer index of the reference frame associated with the first motion vector; and
signaling the reference frame associated with the first motion vector to a decoder by signaling the reference virtual index within the encoded video bitstream.

12. The apparatus of claim 9, wherein:
the plurality of reference frames comprises three reference frames;
a first of the three reference frames is associated with a first unique reference frame identifier and a first unique reference buffer index;
a second of the three reference frames is associated with a second unique reference frame identifier and a second unique reference buffer index;
a third of the three reference frames is associated with a third unique reference frame identifier and a third unique reference buffer index; and
the storing comprises storing a table associating the first of the three reference frames with the first unique reference frame identifier and the first unique reference buffer index, associating the second of the three reference frames with the second unique reference frame identifier and the second unique reference buffer index, and associating the third of the three reference frames with the third unique reference frame identifier and the third unique reference buffer index.

13. The apparatus of claim 12, the instructions further comprising instructions for:
storing the table within the memory.

14. The apparatus of claim 9, the instructions further comprising instructions for:
storing a reference frame identifier with a reference buffer index for each of a plurality of reference frames for a second time after encoding the second frame of the sequence of frames;
updating the plurality of reference frames by updating a reference frame associated with a reference frame identifier for a second time after storing for the second time;
determining multiple candidate motion vectors for a current block of a third frame after updating for the second time, the multiple candidate motion vectors including a first motion vector used to predict a collocated block within the second frame;
performing a motion search for the current block of the third frame within a reference frame of the plurality of reference frames, after updating for the second time, to generate a second motion vector for the current block of the third frame;
comparing the reference buffer index stored with the reference frame identifier of the reference frame associated with the first motion vector used to predict the collocated block within the second frame to a reference buffer index of the reference frame used in performing the motion search for the current block of the third frame; and
on a condition that the reference buffer index of the reference frame used in performing the motion search for the current block of the third frame matches the reference buffer index stored with the reference frame identifier of the reference frame associated with the first motion vector used to predict the collocated block within the second frame, advancing the first motion vector used to predict the collocated block within the second frame ahead of remaining ones of the multiple candidate motion vectors for encoding the current block of the third frame.

15. The apparatus of claim 9, wherein:
the second frame is subsequent to the first frame in the sequence;
the plurality of reference frames comprises:
a last frame in the sequence before a current frame being encoded and has a last frame identifier as the reference frame identifier;
the plurality of reference frames comprises a golden frame having a golden frame identifier as the reference frame identifier; and
an alternate reference frame having an alternate reference frame identifier as the reference frame identifier; and
updating the plurality of reference frames comprises at least one of:
updating a reference buffer index associated with the last frame identifier to a reference buffer index of the first reference frame;
updating a reference buffer index associated with the alternate reference frame identifier to a reference buffer index of a new alternate reference frame; or
updating a reference buffer index associated with the golden frame identifier to a reference buffer index of a new golden frame.

16. The apparatus of claim 9, the instructions further comprising instructions for:
encoding the second motion vector using the first motion vector as a motion vector predictor.

17. The apparatus of claim 9, the instructions further comprising instructions for:
advancing the first motion vector ahead of remaining ones of the multiple candidate motion vectors for encoding the current block by initializing the motion search using the first motion vector.

18. An apparatus for decoding an encoded video bitstream, the encoded video bitstream having a sequence of frames, the frames having blocks formed of pixels, the apparatus comprising:

a processor; and
a memory storing instructions that cause the processor to perform a method comprising:
storing a reference frame identifier with a reference buffer index for each of a plurality of reference frames after decoding a first frame of the sequence of frames;
updating the plurality of reference frames by updating a reference frame associated with a reference frame identifier after the storing;
determining multiple candidate motion vectors for a current block of a second frame after the updating, the multiple candidate motion vectors including a first motion vector used to predict a collocated block within the first frame;
comparing the reference buffer index stored with the reference frame identifier of the reference frame associated with the first motion vector to a reference buffer index of the reference frame used to predict the current block of the second frame; and
on a condition that the reference buffer index of the reference frame used to predict the current block of the second frame matches the reference buffer index stored with the reference frame identifier of the reference frame associated with the first motion vector, advancing the first motion vector ahead of remaining ones of the multiple candidate motion vectors for decoding the current block.

19. The apparatus of claim 18, further comprising:
a second memory separate from the memory; and
the reference buffer index for each of the plurality of references frames representing a unique location for a reference frame within the second memory.

20. The apparatus of claim 18, the instructions further comprising instructions for:
receiving a reference virtual index within the encoded video bitstream, the reference virtual index associated with the reference frame associated with the first motion vector;
decoding the first frame by decoding the collocated block using the first motion vector and the reference frame associated with the first motion vector; and
associating the reference virtual index with the reference buffer index of the reference frame associated with the first motion vector.

* * * * *